United States Patent [19]

Furukawa et al.

[11] Patent Number: 4,683,494

[45] Date of Patent: Jul. 28, 1987

[54] INTER-FRAME PREDICTIVE CODING APPARATUS FOR VIDEO SIGNAL

[75] Inventors: Akihiro Furukawa; Junichi Ohki, both of Tokyo, Japan

[73] Assignee: NEC Corporation, Japan

[21] Appl. No.: 765,357

[22] Filed: Aug. 13, 1985

[30] Foreign Application Priority Data

| Aug. 13, 1984 | [JP] | Japan | 59-169011 |
| Dec. 24, 1984 | [JP] | Japan | 59-272434 |
| Dec. 28, 1984 | [JP] | Japan | 59-277488 |
| Jan. 29, 1985 | [JP] | Japan | 60-14744 |
| Jan. 29, 1985 | [JP] | Japan | 60-14745 |

[51] Int. Cl.$^4$ ............................................. H04N 7/12
[52] U.S. Cl. .................................... 358/136; 358/135
[58] Field of Search ............... 358/135, 136, 105, 133

[56] References Cited

U.S. PATENT DOCUMENTS

| 4,245,248 | 1/1981 | Netravali et al. | 358/136 |
| 4,371,895 | 2/1983 | Koga | 358/136 |
| 4,386,366 | 5/1983 | Mori | 358/135 |
| 4,562,468 | 12/1985 | Koga | 358/135 X |

FOREIGN PATENT DOCUMENTS 0159506 10/1985 European Pat. Off. ............. 358/136

OTHER PUBLICATIONS

"Interframe Coding at Low Bit Rates with Great Error Resistance", Temine; ICC Conference, Jun. 1980; pp. 1–5.

"Source Coding of T.V. Signals Using Interframe Techniques", Haskell et al., 1975, pp. 9–22.

"Estimating the Velocity of Moving Images in Television Signals", J. O. Limb and J. A. Murphy, Computer Graphics and Image Processing, Academic Press, Inc., 1975.

*Primary Examiner*—James J. Groody
*Assistant Examiner*—Victor R. Kostak
*Attorney, Agent, or Firm*—Ostrolenk, Faber, Gerb & Soffen

[57] ABSTRACT

A video coding apparatus having a quantizer that is controlled by a quantization control signal. Stationary picture elements are coded such that quantization is coarse, which reduces the output information for the picture elements in the stationary image region and increases compression of the signal. The apparatus may include a calculation system for calculating a distance of a stationary picture element from the moving image region. The quantization is performed more coarsely as the calculated distance becomes longer. The quantizer may also be controlled such that coarse quantization is performed over a plurality of frames for the picture elements in the stationary region, and at a predetermined interval finer quantization is performed with respect to the same stationary picture elements, for further improving the picture. Transition of a picture element from the stationary region to the moving region may be detected, and the quantizer may be controlled to perform fine quantization when the transition is detected, and thereafter perform coarse quantization.

10 Claims, 15 Drawing Figures

|  | $A_3$ | $A_2$ | $A_1$ | $A_0$ | $O_S$ | $O_D$ |
|---|---|---|---|---|---|---|
| $P_1$ | 0 | 0 | 0 | 0 | 0 | $D_2$ |
| $P_2$ | 0 | 0 | 0 | 1 | 1 | $D_1$ |
|  | 0 | 0 | 1 | 0 | 0 | $D_1$ |
|  | 0 | 0 | 1 | 1 | 1 | $D_1$ |
|  | 0 | 1 | 0 | 0 | 0 | $D_1$ |
|  | 0 | 1 | 0 | 1 | 1 | $D_1$ |
|  | 0 | 1 | 1 | 0 | 0 | $D_1$ |
|  | 0 | 1 | 1 | 1 | 1 | $D_1$ |
| $P_3$ | 1 | 0 | 0 | 0 | 0 | $D_0$ |
|  | 1 | 0 | 0 | 1 | 1 | $D_1$ |
|  | 1 | 0 | 1 | 0 | 0 | $D_1$ |
|  | 1 | 0 | 1 | 1 | 1 | $D_1$ |
|  | 1 | 1 | 0 | 0 | 0 | $D_1$ |
|  | 1 | 1 | 0 | 1 | 1 | $D_1$ |
|  | 1 | 1 | 1 | 0 | 0 | $D_1$ |
|  | 1 | 1 | 1 | 1 | 1 | $D_1$ |

INTER-FRAME PREDICTIVE CODING APPARATUS FOR VIDEO SIGNAL

BACKGROUND OF THE INVENTION

The present invention relates to a digital transmitting apparatus for a video signal, and more particularly to an inter-frame predictive coding apparatus for the video signal.

An inter-frame predictive coding apparatus has been conventionally well-known as a system of performing compression coding for a video signal such as a television signal and the like. In the inter-frame predictive coding apparatus, a difference in amplitude of picture elements (pixels) at a given location, between a past frame memorized in a memory and the present frame, is detected and quantized for transmission. This apparatus has the advantage that it is possible to perform extremely great compression when a stationary image or an image having a small moving region is coded. However, it has the disadvantage that the compression effect is reduced as the area of a moving region becomes larger. In order to remove this disadvantage, a motion compensation coding method has been employed. In this method, a motion vector which corresponds to the movement in the image is detected for each of the picture elements, or for one or more blocks which have been previously designated in an image screen, and the difference between the frames is calculated, with spatial correction in accordance with the motion vector. One example of this method is disclosed in U.S. Pat. No. 4,371,895 to Koga titled "CODED VIDEO SIGNAL TRANSMITTING AND RECEIVING SYSTEM".

When employing either the inter-frame predictive coding or the motion compensation coding, no information should be generated, theoretically, for a stationary input image or a stationary region in a moving image, but in practice, level fluctuation unavoidably occurs in the luminance amplitude value, under the influence of noise in the input video signal, or jitter in sampling pulses. As a result, a great deal of information is often generated undesirably in relation to a stationary image or a stationary region of a moving image. One possible method of reducing the amount of undesirable information is to provide coding control by using sub-sampling. This method is disadvantageous in that spatial resolution is reduced in the stationary region, that is, the image in the stationary region is blurred.

SUMMARY OF THE INVENTION

It is therefore an object of the present invention to provide an inter-frame predictive coding apparatus in which a high compression effect can be obtained without substantially degrading the image in a stationary region.

According to the present invention, there is provided an inter-frame coding apparatus having a quantizer, which comprises means responsive to the input video signal for determining whether respective picture elements correspond to a moving video content or to a stationary video content to produce a moving-stationary information signal; means for storing the moving-stationary information signal of at least one frame period; and means for determining a quantization characteristic in response to the moving-stationary information stored in the storing means to produce a quantization control signal; wherein the quantizer is controlled by the quantization control signal. When the picture elements of stationary video content are detected, the quantizer is controlled such that quantization of the difference signal with respect to those picture elements of the stationary video content is made coarsely, whereby the output information of the quantizer for the picture elements in the stationary image region is caused to tend to be zero and the high compression effect is obtained.

The quantization characteristic determining means may include a calculation means for calculating a distance of the picture element in the stationary image region from the moving image region. The quantization is performed more coarsely as the calculated distance is longer.

The quantizer may be controlled such that coarse quantization is performed over a plurality of frames with respect to the picture elements belonging the stationary image region, and at a predetermined interval finer quantization is performed with respect to the same picture elements.

The transition of a picture element from the stationary image region to the moving image region may be detected and the quantizer may be controlled such that fine quantization is performed with respect to that picture element when the transition is detected and thereafter quantization is performed coarsely.

BRIEF DESCRIPTION OF THE DRAWINGS

FIG. 8 is a block diagram of a quantization controlling circuit shown in FIG. 7;

DETAILED DESCRIPTION OF PREFERRED EMBODIMENTS OF THE INVENTION

In the present invention, it is necessary to discriminate a stationary image region, within an image. Various discriminating methods can be used for this purpose and the method of the invention is not limited to the use of a particular one of these. Examples of such methods are disclosed in an article, "Estimating the Velocity of Moving Images in Television Signals" by J. O. Limb et.

al., Computer Graphics and Image Processing (1975) 4, p. 311 to 327, and in U.S. Pat. No. 4,371,895.

Hereinafter, one example will be described: An input image of one frame, which does not include distortion such as a quantizing error or the like, is stored, and then the difference in the luminance amplitude of the picture element at a given position between the stored image and a present image is determined. Even if there is a difference in the luminance amplitude (frame difference value) for a given picture element, and even when its absolute value is large, it is not necessarily true that the picture element belongs to the moving image region, since the detected level fluctuation in the luminance signal might have been caused by random noise.

However, random noise is generated in the stationary image region and in the moving image region almost equally, if a block or a region having a certain broadness is considered. Accordingly, when the absolute value of the frame difference value, including this noise, is integrated over a block having a certain broadness, the integral is nearly constant. Therefore, when the integral is taken of the absolute value of a frame difference value, over a block, when the frame difference value is caused by movement in the image, the integral will always include this constant value based on the underlying noise.

Consequently, it is possible to discriminate the moving image region from the stationary image region by using this constant value as a threshold value. That is, if the integral exceeds the constant value, the bock belongs to the moving image region, and if not, it belongs to the stationary image region. Alternatively, if a "significant picture element" is defined to be a picture element whose frame difference value surpasses a certain value, it is possible to discriminate the moving image region from the stationary image region by comparing the number of significant picture elements in a given block with a threshold value.

According to an aspect of the present invention, after the stationary image region is detected as aforementioned, then a threshold of a quantization characteristic is set, as further described below. This threshold defines the range of an input signal in response to which the output signal remains zero (this range being defined as a dead zone). The quantization characteristic is set so as to either expand or contract the dead zone. Such control of the initial step of the quantization characteristic is defined as dead zone control, hereinafter.

Figure 1:
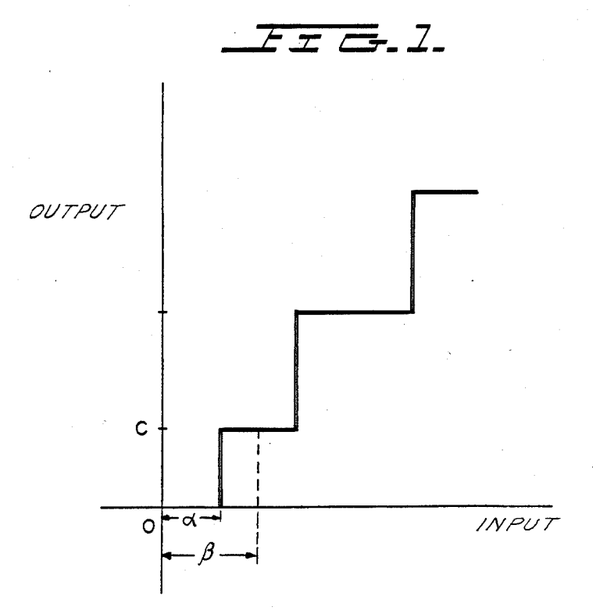
FIG. 1 is a graph showing a quantization characteristic in which a dead zone is changed.

With reference to FIG. 1, $\alpha$ denotes a normal dead zone and $\beta$ denotes an expanded dead zone. The quantization characteristic control in accordance with the dead zone control is advantageous, because no control imformation is required to be sent to a receiving side (decoding side) and an input video signal having a large amplitude is not influenced by the dead zone control. Therefore, the dead zone control is fundamentally different from a conventional quantization step control.

Figure 2:
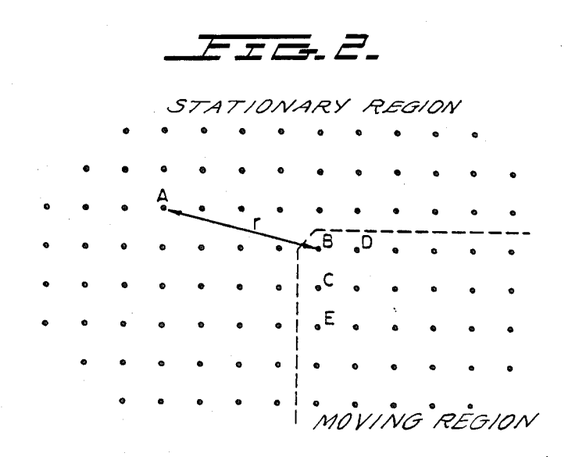
FIG. 2 is a graph for explaining a distance between a picture element in a stationary region and that in a moving region.
Figure 3:
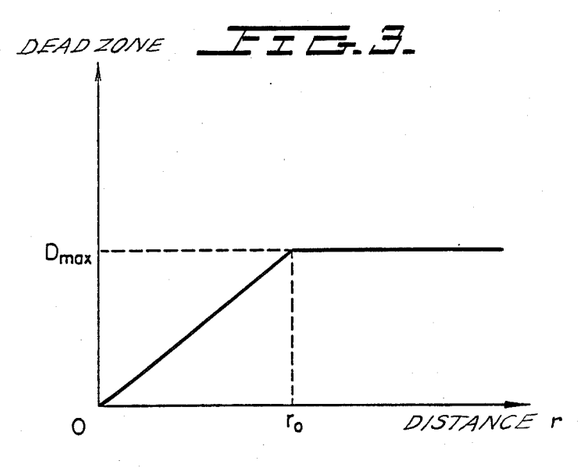
FIG. 3 is a graph for explaining a first method of a dead zone control according to the present invention.

Next, various methods of dead zone control according to the present invention will be described with reference to the drawings. According to a first dead zone control, as shown in FIG. 2, when a certain picture element A is in a stationary region, the distance between the picture element A and a moving region is measured. This measurement is done such that distances of the element A from picture elements B, C, D and E in the moving region are calculated and compared to each other to find a minimum distance in this example. The minimum distance is that between the picture elements A and B and it is considered to be the distance (r) between the picture element A and the moving region. And as shown in FIG. 3, the quantization characteristic having a dead zone which is enlarged in accordance with the distance r is applied to the inter-frame predictive coding. In the area of $r \leq r_o$, it is proper to determine the maximum dead zone $D_{max}$.

Such a process not having the dead zone control is similar to a conventional inter-frame predictive coding apparatus. In this method of dead zone control according to the present invention, a small dead zone is applied for the stationary region near the moving region and a larger dead zone is applied for the stationary region as the distance therebetween increases. Further, it is possible to vary the width of quantization steps and change the fineness or coarseness of the quantization characteristics in accordance with the distance r, in addition to the dead zone control.

Figure 4:
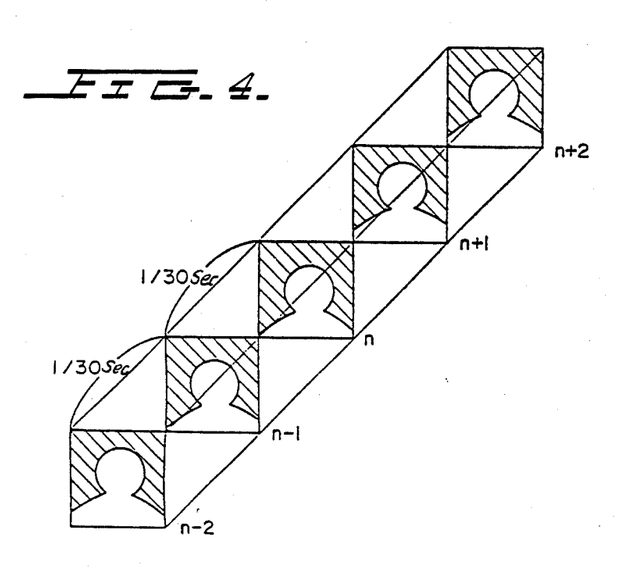
FIGS. 4 and 5 are graphs for explaining a second method of the dead zone control according to the present invention.

Next, with reference to FIGS. 4 and 5, a second dead zone control method will be described. In the second dead zone control, normal coarse quantization is ordinarily applied to a picture element in the stationary image region but fine quantization is applied to a picture element of the stationary region in only a certain frame. In FIG. 4, it is assumed that an oblique line portion in each frame is regarded as the stationary image region. Normally, coarse quantization is performed in the stationary region, i.e., the oblique portion. By the ordinary coarse quantization, it is possible to suppress information generated by the noise contained in the stationary region. Further, during only a certain frame, for example, the frame n in FIG. 4, the fine quantization is applied to the whole stationary region. By the fine quantization, it is possible to remove spots on an image resulting from the coarse quantization and an interpolation error. Such spots are frequently generated at a border between the moving image region and the stationary image region, and in the stationary image region after a scene of the image is changed. After the fine quantization is once applied, if the quantization is changed to the coarse, the spots on the image are not generated in the stationary region and the amount of information generated from the stationary region is reduced again.

Figure 5:
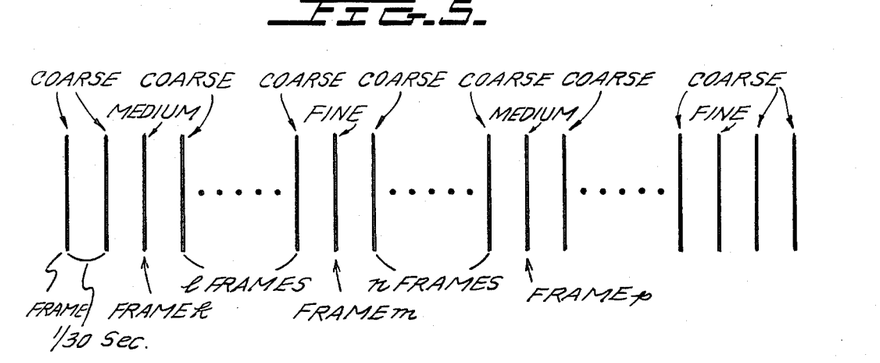

FIG. 5 shows a method for changing the quantization for the stationary image region from the coarse, to medium and to fine quantization in a frame unit. After the detection of the moving region and the stationary region, the coarse quantization is normally applied to the stationary region and a medium quantization is applied to the stationary region at a certain frame k. The coarse quantization is again applied to the stationary image region during an interval of l frames after the frame k, and the fine quantization is then applied to the stationary image region at a frame m. Further, the coarse quantization is applied to the stationary image region during an interval of n frames after the frame m and the medium quantization is applied to the stationary image retion at a frame p. If only the coarse quantization is applied to the stationary image region, the spots on the image generated in the stationary region under the condition of the scene change are still left. But if the medium quantization is used, it is possible to improve the image by adding only a small amount of further information. In this case, if the medium quantization is temporarily performed, it is possible to limit increase of the amount of information even when the fine quantization is subsequently applied. This avoids the problem that, if the fine quantization were performed immediately after the coarse quantization, the amount of information generated would increase too sharply. Further, during the intervals of the l and n frames after the medium and fine quantization, the coarse quantization is applied so as to absorb or average the increase of information in a buffer memory. That is, when the amount of information is increased by the fine quantization, the generation of the information is suppressed for a certain time period after that.

Now, a third dead zone control method will be described. In the third dead zone control method, information of the moving region and the stationary region, which is already detected with respect to each picture element or each block, is memorized during the past N frames including the present frame. The information of the moving region and the stationary region is defined as moving-stationary region information. The third method serves to perform a coding control including the dead zone control in accordance with time transit of the moving-stationary information during N frame periods. For example, in a continuous moving region or a transit region from the stationary region to the moving region, a sub-sample method is applied. In the transit region from the moving region to the stationary region, since the inferiority of an image quality is marked, a quantization characteristic having a narrow dead zone is temporarily applied thereto so as to perform coding of a excellent image quality; then, when the stationary region is continued, the quantization characteristic of a wide dead zone is applied thereto. If the dead zone is widened immediately after the completion of the transit to the stationary region, there remain an interpolation error and a quantization error brought about when applying the sub-sample and the coarse quantization to suppress the amount of information for the moving region. As a result, the image quality is much lowered. However, if the dead zone is made narrow for a short time, these faults can be removed, and the information generation resulting from the noise can be further suppressed by expanding the dead zone after that.

Figure 6:
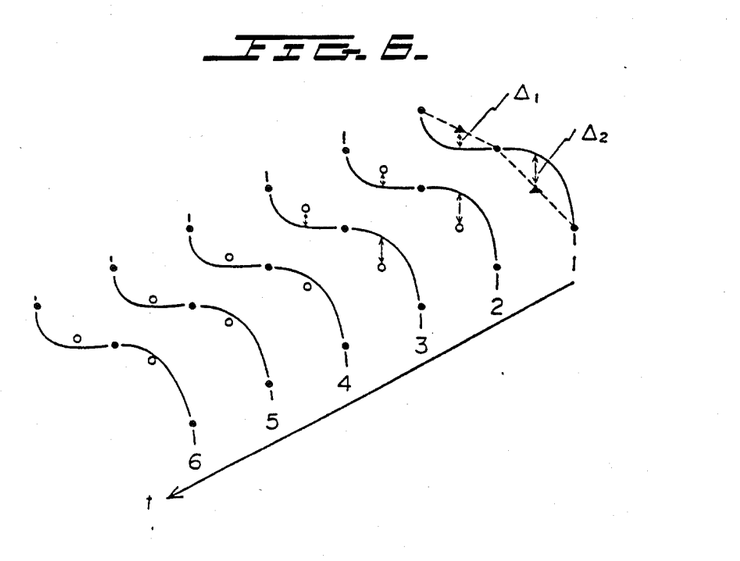
FIG. 6 is a graph for explaining a third method of the dead zone control according to the present invention.

The detailed description will be further added to the above description with reference to FIG. 6. In FIG. 6, it is assumed that a form indicated by a solid line is an original form to be coded during time points 1 to 6. It is further assumed that the sub-sampling method is applied for suppressing the amount of coded information at the time point 1, and a normal sampling method is applied at the time point 2. At time point 1, picture elements which are not sampled (black triangle) can be produced by a interpolation on the basis of the sampled picture elements (black circle), thereby causing interpolation errors $\Delta_1$ and $\Delta_2$. In this case, if the quantization step width or the dead zone width is greater than such interpolation errors $\Delta_1$ and $\Delta_2$, the interpolation errors remain as shown in the time points 2 and 3, because of the predictive coding, even when the normal sampling method is applied. However, if the dead zone is temporarily made smaller at the time point 4, the interpolation error is greatly removed and a coded value approximates to the original value shown by the solid line. Afterwards, the amount of the information caused by a noise can be suppressed by widening the dead zone, again. As a result, as shown in the time points 5 and 6, the coded value are maintained desirably. Consequently, the coarse sampling and the fine quantization characteristic are respectively applied to the moving region and the stationary region temporarily, and then, the coarse quantization characteristic is applied to the stationary region.

Figure 7:
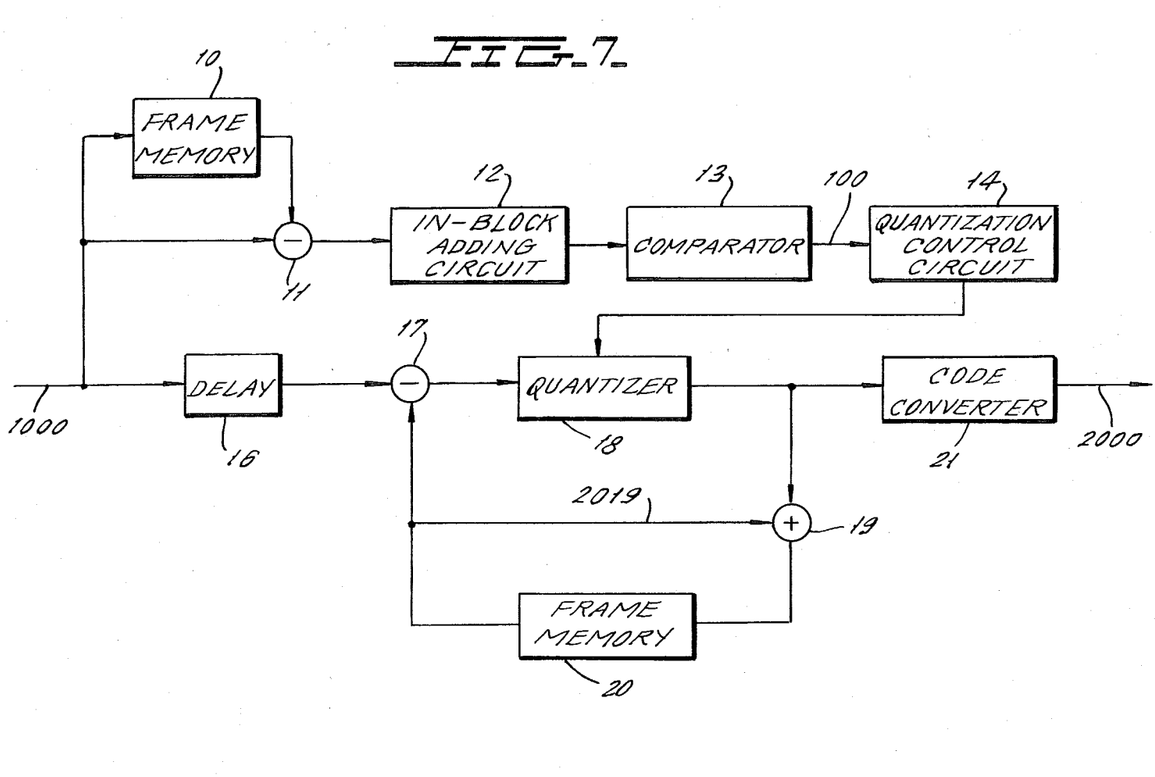
FIG. 7 is a block diagram of a first embodiment of the present invention.

Next, embodiments of the present invention will be described with reference to the drawings. FIG. 7 shows a first embodiment of the present invention. An input digitized video signal is supplied through a line 1000 to a delay circuit 16, a subtractor 11 and a frame memory 10. The frame memory 10 delays the input signal by a one-frame period, and then outputs it to the subtractor 11. The subtractor 11 computes a frame difference and then outputs it to an in-block adding circuit 12. The in-block adding circuit 12 is comprised of an absolute value calculator, line memories and an adder. The in-block adding circuit 12 computes the sum of the absolute value of the frame difference with respect to all the picture elements existing within each block and outputs the sum of each block to a comparator 13. The comparator 13 compares the sum with a predetermined threshold value and determines whether the block is in the moving region or in the stationary region. When the sum is greater than the threshold value, the block is determined to be in the moving region and when not, in the stationary region. Finally, the comparator 13 outputs the moving-stationary information for each picture element to a quantization controlling circuit 14 via a line 100. When the moving-stationary information is "1", it means the picture element is located in the moving region, and when the moving-stationary information is "0", the picture element is located in the stationary region.

The quantization controlling circuit 14 will be explained in detail with reference to FIG. 8. The moving-stationary information of "1" or "0" supplied through the line 100 is memorized in a moving-stationary memory 30 in accordance with a write-in address delivered from an address generating circuit 32 via a line 3230W and the moving-stationary information is read-out from the memory 30 in accordance with a read-out address delivered from the circuit 32 via a line 3230R. The write-in address and the read-out address are in synchronism with the speed of the moving-stationary information delivered from the comparator 13 (FIG. 7). The read-out moving-stationary information is supplied to a controlling circuit 31 via a line 3031 and to a discriminating circuit 33 via a line 3033. The controlling circuit 31 outputs the distance r of "0" to a selector 34 via a line 3139 and a delay circuit 39 in relation to a picture element for which the moving-stationary information is "1" i.e., the moving region, and delivers a control signal via a line 3134 to the selector 34 so as to select the output of the delay circuit 39.

On the other hand, when the read-out moving-stationary information is "0" i.e., stationary, the controlling circuit 31 delivers the control signal to the selector 34 so as to select an output of a memory 38. Further, the controlling circuit 31 delivers a trigger signal to the address generating circuit 32 via a line 3132 and a latch signal to a calculating circuit 36 via a line 3136 to receive the current read-out address supplied via a line 3236R. In response to the trigger signal, the address generating circuit 32 sequentially generates a plurality of rapid read-out addresses and supplies them to the memory 30 via line 3230R' and to the calculating circuit 36 via line 3236R'. A plurality of the rapid read-out addresses designate the surrounding area of the picture element having the moving-stationary information of "0", i.e., the received current read-out address, and the surrounding area has a predetermined size.

The moving-stationary information ("0" or "1") in the surrounding area is sequentially read-out in accordance with the rapid read-out addresses and sequentially supplied to a discriminating circuit 33. When the moving-stationary information is "1", the discriminating circuit 33 controls the calculating circuit 36 via line 3336 to receive the rapid read-out addresses and to compute the distance between the picture element (stationary picture element) having the moving-stationary information of "0" and the nearby picture element (moving picture element) having the moving-stationary information of "1". Assuming the read-out address of the stationary element is (X, Y) and the rapid read-out address of the moving element is (x, y), the distance r is computed by $\sqrt{(X-x)^2+(Y-y)^2}$. The calculating circuit 36 computes the distance r whenever the discriminating circuit 33 detects the moving stationary information of "1". The computed distance is supplied to a comparator 37. The comparator 37 compares the computed distance with the output of the memory 38 supplied thereto via a line 3837 and, then, stores the shorter one in the memory 38. This means that the minimum distance between the moving picture element in the surrounding area and the stationary picture element is finally stored into the memory 38 and is output to the selector 34 via the line 3834.

In response to the control signal on the line 3134, the selector 34 selects the output r=0 of the line 3934 in relation to the picture element in the moving region. In relation to the picture element in the stationary region, it selects the minimum distance on the line 3834, and passes it to a characteristic determining section 35. In relation to the picture element in the stationary region, the characteristic determining section 35 outputs a quantization characteristic control signal, which makes quantization coaster in accordance with the distance between the picture element in the stationary region and the moving region, to a quantizer 18 shown in FIG. 7 via a line 200.

Referring back to FIG. 7, a delay circuit 16 delays the input video signal by a required time for the discrimination between the movement and the stationary conditions and for the computation of the distance from the moving region. The delayed video signal is supplied to a subtractor 17. The subtractor 17 calculates a difference between the output video signal of the delay circuit 16 and a prediction signal supplied from a frame memory 20, and delivers the difference to the quantizer 18 as a predictive error signal. The quantizer 18 quantizes the predictive error signal in accordance with the quantization characteristics controlled by the signal delivered from the quantization controlling circuit 14, and outputs the quantized result to a code converter 21 and an adder 19. The adder 19 adds the quantized prediction error signal to the predictive signal supplied via a line 2019, and outputs the added result to the frame memory 20 as a local decoded signal. The code converter 21 converts the quantized predictive error signal into a high-efficiency code (for example, a Huffman code) and outputs the coded result to a transmission path 2000.

Figure 9:
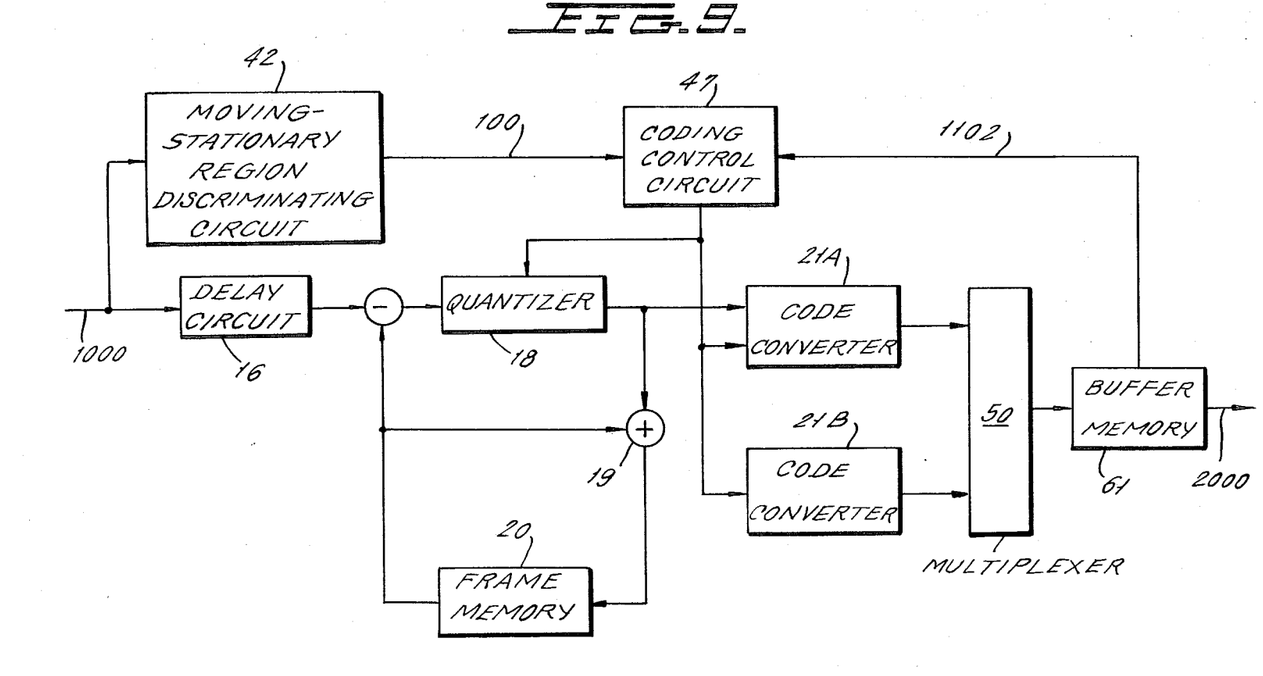
FIG. 9 is a block diagram of a second embodiment of the present invention.

FIG. 9 shows another embodiment of the present invention. In FIG. 9, a digitized video signal from a line 1000 is supplied to a delay circuit 16 and a moving-stationary region discriminating circuit 42.

Figure 12A:
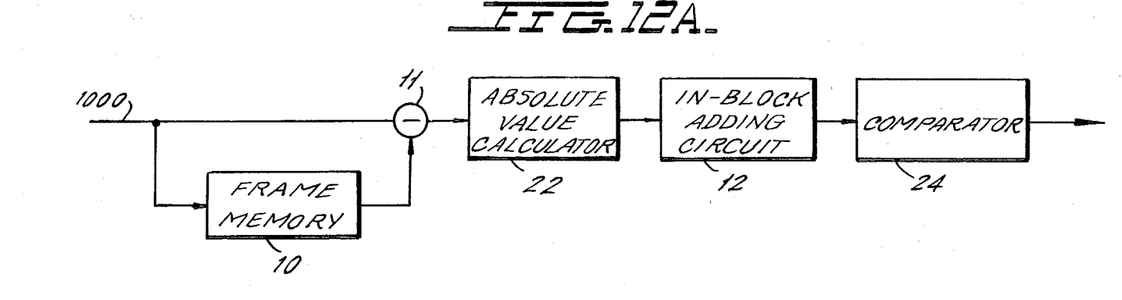
FIGS. 12(A) and 12(B) are block diagrams of a moving-stationary region separating circuit.

The moving-stationary region discriminating circuit 42 is shown in FIG. 12(A) or (B). In both FIGS. 12(A) and (B), a frame memory 20 memorizes one frame of the video signal to delay the input video signal by one-frame time and, then, outputs it to a subtractor 11. The subtractor 11 computes a frame difference and outputs the frame difference to an absolute value calculator 22. The absolute value calculator 22 computes an absolute value of the frame difference and outputs it, in case of FIG. 12(A), to a in-block adding circuit 12 and, in case of FIG. 12(B), to a comparator 25.

First, the case of FIG. 12(A) will be described. The in-block adding circuit 12 computes the sum of absolute values of the frame difference in relation to all of the picture elements included in each of blocks which are predetermined or previously designated on the image or TV screen for discriminating between the moving region and the stationary region. The circuit 12 comprises random access line memories and an adder, and outputs the computed result to a comparator 24. The comparator 24 compares the sum of absolute values of the frame difference within each block with a predetermined threshold value. Under the comparison, the comparator 24 outputs information for each block, i.e., moving region information, when the sum of absolute values of the frame difference in the block is larger than the threshold value, or stationary region information when the sum is not larger. The just-mentioned moving region information and the stationary region information correspond to moving-stationary information as discussed above.

Figure 12B:
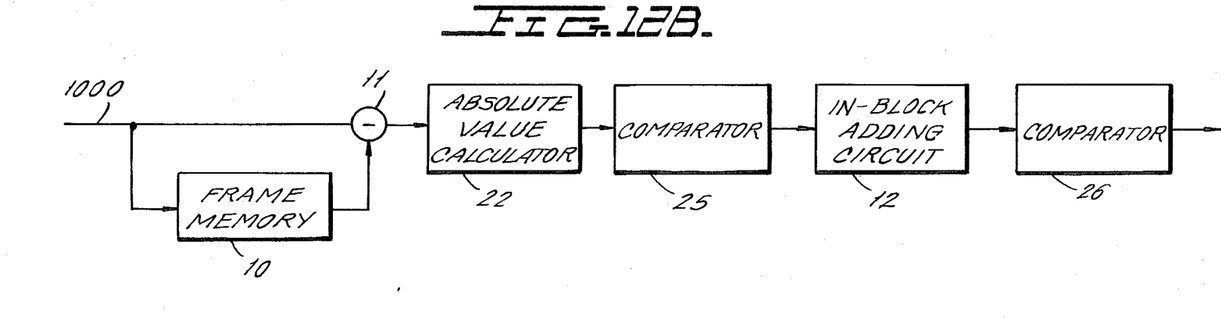

Next, the arrangement of FIG. 12(B) will be described. The comparator 25 outputs "1" representative of a significant picture element when the absolute value of the frame difference is larger than a predetermined threshold value or "0" when the absolute value is not larger, with respect to each picture element. The in-block adding circuit 12 fundamentally has the same function as that shown in FIG. 12(A), but, it receives an input of "1" or "0". Therefore, the adding circuit 12 adds inputs of "1" within each block and outputs the result to a comparator 26 as the number of significant picture elements within the one block. The comparator 26 compares the number of significant picture elements of the one block with a predetermined threshold value, and outputs moving-stationary information that the block is a moving region when the former is larger, or that the block is a stationary region when the former is smaller.

Referring back to FIG. 9, the moving-stationary information delivered from the moving-stationary region discriminating circuit 42 is supplied to a coding control circuit 47 via a signal line 100. The video signal delayed by the delay circuit 16 is supplied to a subtractor 17. The subtractor 17 computes a frame difference between the delayed video signal and a prediction signal delivered from a frame memory 20 and sends it to a quantizer 18 as a prediction error signal. When the prediction error signal is quantized in the quantizer 18, the quantization characteristic thereof is subjected to a change between coarse and fine quantizations or among coarse, medium and fine quantizations, in relation to the stationary region, as shown in FIG. 5, by means of a quantization control signal delivered from the coding control circuit 47. In the moving region, the quantization is accomplished by a conventional technique, for example, in response to an occupied state of a buffer memory 61. Then, the prediction error signal quantized in the quantizer 18 is supplied to an adder 19 and a code converter 21A. The adder 19 adds the quantized prediction error signal to the prediction signal delivered from a frame memory 20 and supplies the reasult to the frame memory 20 as a local decoded signal. The code converter 21A converts the prediction error signal supplied from a quantizing circuit 18 to a variable length code and compresses it.

The code converter 21A converts the quantized prediction error signal into a variable length code for information compression in accordance with the quantization control signal delivered from the coding control circuit 47, and outputs the variable length code to a multiplexer 50. A code converter 21B converts the quantization control signal into a mode code which indicates any quantization characteristic that is applied to the code converter 21A and outputs the mode code to the multiplexer 50. The multiplexer 50 multiplexes the mode code and the variable length code of the prediction error signal, and outputs the multiplexed code to the buffer memory 61. The buffer memory 61 performs matching between a speed of the multiplexed code and the transmitting speed of a transmission path 2000. A buffer occupancy showing the occupied state of the buffer memory 61 is supplied to the coding control circuit 47 via a signal path 1102.

Figure 10:
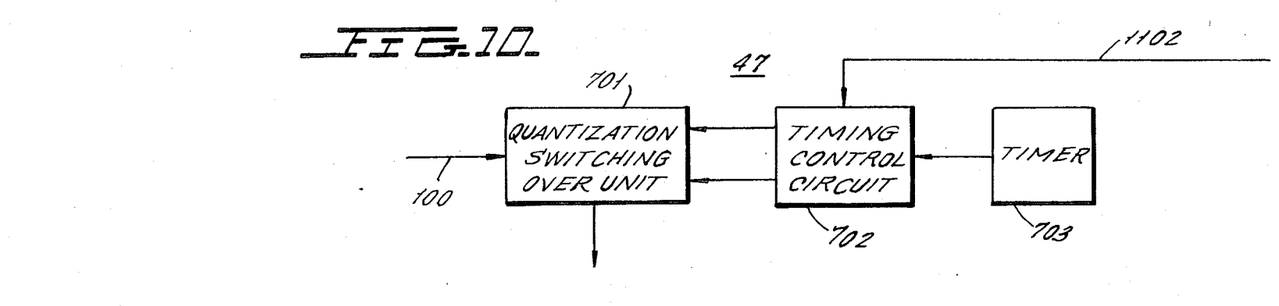
FIG. 10 is a block diagram of a coding control circuit shown in FIG. 9.

As shown in FIG. 10, the coding control circuit 47 comprises a quantization switching-over unit 701, a timing control circuit 702 and a timer 703. The timer 703 supplies a timing signal to the timing control circuit 702 at an optional period. The timing control circuit 702 converts the timing signal from the timer 703 into two kinds of timing signals showing timing for realizing, for example, medium and fine quantizations. In the timing control circuit 702, when the timing signal is given from the timer 703, the medium quantization is realized and, when the next timing signal from the timer is given thereto, the fine quantization is realized, for example. As stated above, the timing control circuit 702 alternately outputs timing signals for realizing the medium or fine quantization in accordance with the timing signal from the timer 703. Further, the timing control circuit 702 monitors the amount of generated information on the basis of the buffer occupancy of the buffer memory 61 supplied through the signal line 1102 and, when much information is generated, it inhibits delivery of the timing signal for realizing the medium or fine quantization. Alternatively, when little information is generated, the timing control circuit 702 outputs the timing signal for realizing the medium or fine quantization and supplies it to the quantization switching-over unit 701. The quantization switching-over unit 701 outputs the quantization switching signal on the basis of the timing signal to realize the medium or fine quantization supplied from the timing control circuit 702 and the moving-stationary region discriminating signal supplied from the moving-stationary region separating circuit 42 through the signal line 100. When the quantization switching-over unit 701 does not receive the timing signal from the timing control circuit 702, it outputs the quantization switching signal to select the coarse quantization for the portion discriminated as the stationary region in response to the moving-stationary region discriminating signal. When the unit 702 receives the timing signal for realizing the medium or fine quantization, it supplies to the quantizer 18 the quantization switching signal to realize the medium or fine quantization for the portion discriminated as the stationary region. Such timing control can be realized by supplying the buffer occupancy on the signal line 1102 to the timer 703 and, when the buffer occupancy exceeds a certain value, by stopping the operation of the timer 703.

As described above, in accordance with the moving-stationary region discriminating signal and the buffer occupancy, there is adaptively carried out the quantization switching, such as the selection of the quantization characteristic in relation to the moving region and the selection of the quantization characteristic, by changing the step to provide coarse, medium and fine steps of the quantization for a frame unit, in relation to the stationary region.

Figure 11:
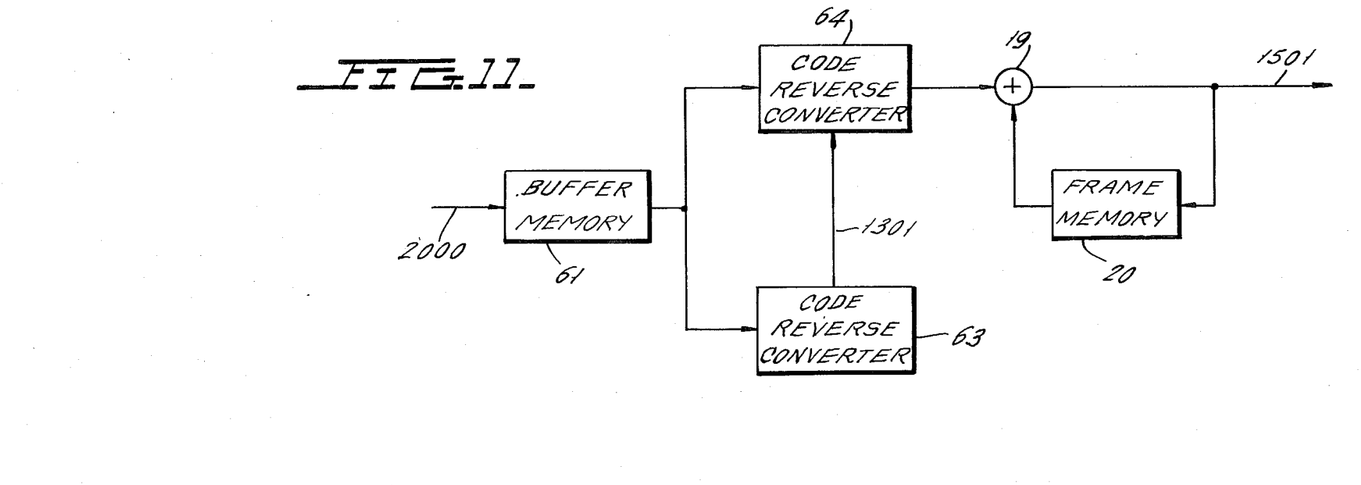
FIG. 11 is a block diagram of a decoding side.

Next, a decoding side will be described with reference to FIG. 11. A buffer memory 61 matches a compressed and coded signal sent at fixed speed from the coding side through the transmission path 2000 with a speed for decoding, and outputs the signal to code reverse converters 63 and 64. The code reverse converter 63 selects only the mode code in the multiplexed compression codes, and decodes it. The decoded signal indicating the quantizing characteristic is supplied to the code reverse converter 64 through the signal path 1301 and is utilized for controlling quantization switching. The code reverse converter 64 decodes the variable length codes except the mode code in the multiplexed compression codes on the basis of the quantization characteristic supplied through the line 1301, and outputs a decoded prediction error signal to an adder 19. The adder 19 adds the decoded prediction error signal sent from the code reverse converter 64 and a prediction signal from a frame memory 20 to produce a decoded video signal. The decoded video signal is supplied to an external circuit via a line 1501 and to the frame memory 20.

Figure 13:
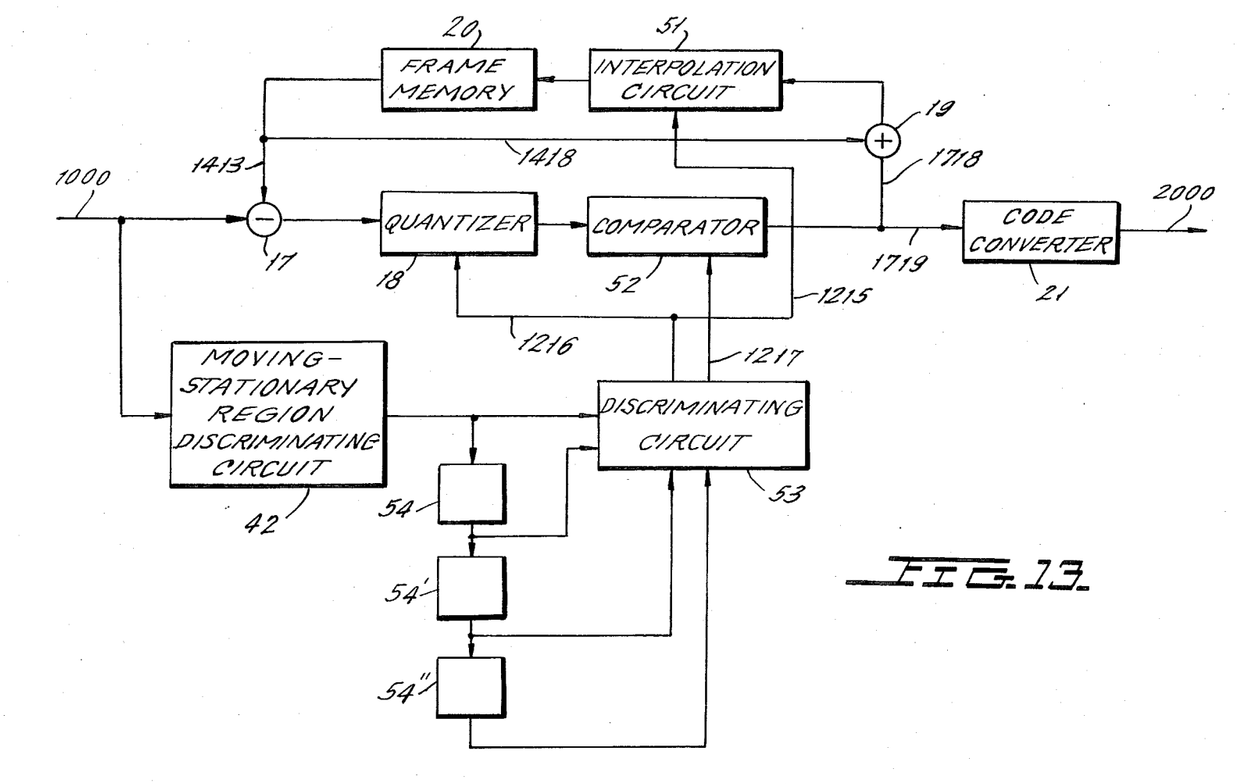
FIG. 13 shows a block diagram of a third embodiment of the present invention.

Next, the third embodiment of the present invention will be described with reference to FIG. 13. In this Figure, an input digital video signal is supplied through a line 1000 to a moving-stationary region discriminating circuit 42 and a subtractor 17. The moving-stationary region discriminating circuit 42 similar to the circuit 42 shown in FIG. 9 outputs the moving-stationary discriminating result to a series of memories generically designated 54 and a discriminating circuit 53. The memories 54 memorize the moving-stationary discriminated result for respective states of one frame. In this embodiment, the moving-stationary discriminated results one frame period previous, two frame periods previous, and three frame periods previous are delivered from the series of memories 54 and supplied to the discriminating circuit 53. The discriminating circuit 53 produces a sub-sample control signal in response to the information whether each focused picture element is the moving picture element or the stationary one and its time transit and supplies it to a quantizer 18 and an interpolation circuit 51 through lines 1216 and 1215. Further, the discriminating circuit 53 produces an assigned dead zone value as a dead zone control signal and outputs it to a comparator 52 through a line 1217. This discriminating circuit can be realized by using, for example, a read-only memory (ROM) whose addresses are supplied from the memories 54, 54' and 54" and whose outputs are used for the dead zone assigned value and the sub-sample control signal.

Figure 14:
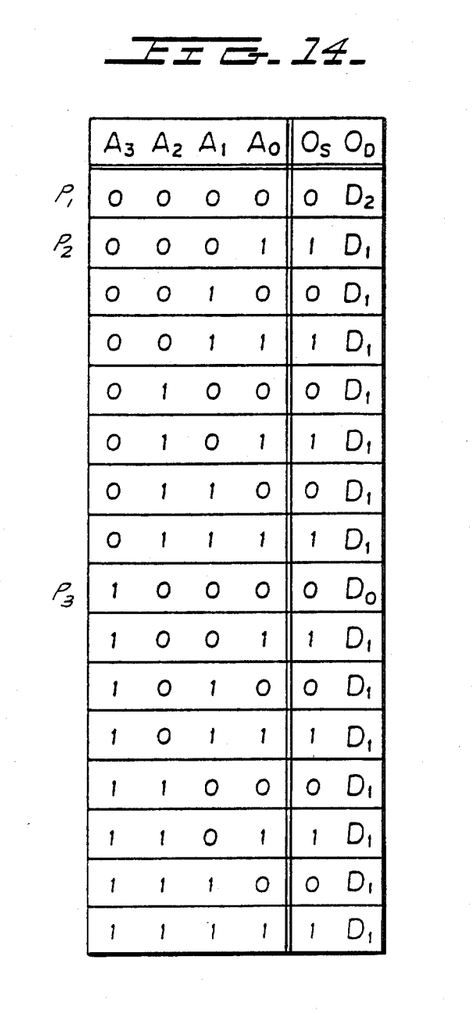
FIG. 14 shows an example of a content of a read only memory which is used for a discriminating circuit shown in FIG. 13.

FIG. 14 shows one example of a logic content of the ROM as the discriminating circuit 53. $A_0$, $A_1$, $A_2$ and $A_3$ denote the input address and $O_S$ and $O_D$ denote the output, i.e., the sub-sample control signal and the dead zone assigned value. Herein, $A_0$, $A_1$, $A_2$ and $A_3$ respectively are the moving-stationary discriminated results of a present frame, one frame period previous, two frame periods previous, and three frame periods previous. In this case, "1" corresponds to the moving information and "0" corresponds to the stationary information. For example, as shown by $P_1$ in FIG. 14, when the address ($A_3$, $A_2$, $A_1$, $A_0$) is (0, 0, 0, 0), it shows that the four frame periods including the present frame period in the focused block or the focused picture element are sequentially stationary. The address (0, 0, 0, 1) at $P_2$ shows the case where the previous three frame periods are in the stationary region and the present one is in the moving region, that is, the case where a moving object newly occurs. The address (1, 0, 0, 0) at $P_3$ shows the case where a frame three periods previous to the present frame is in the moving region and the remaining frame periods are all in the stationary region. The output of $O_S$ denotes the sub-sample control signal and, when it is "1", shows that the sub-sampling is carried out. $O_D$ denotes the dead zone assigned value and a relation of $D_2 > D_1 > D_0$ is established. That is, when the present frame period is in the moving region, sub-sampling is carried out. At this time, the dead zone assigned value is $D_1$. While, when the present frame period is in the stationary region, normal sampling is carried out, and the dead zone assigned value can thus be changed into three kinds of values. Namely, when the frame period which is three frame periods previous to the present one is in the moving region and the following three frame periods including the present one are in the stationary region ($P_3$), the dead zone is temporarily reduced to $D_0$. At this time, the inferiority of image quantity caused by a quantization error and an interpolation error is improved. When sequential four frame periods are in the stationary region ($P_1$), that is, where, after the dead zone is temporarily reduced as stated above, the frame period of the stationary region is further continued, the dead zone is expanded so as to be $D_2$ for the purpose of suppressing the information generation caused by a noise. In the other cases, the dead zone is settled at $D_1$.

Referring back to FIG. 13, the subtractor 17 produces a frame difference, i.e., a prediction error signal between the input video signal and a prediction signal supplied via a line 1413 from a frame memory 20 and supplies it to a quantizer 18. The quantizer 18 supplies the quantized output of the prediction error signal to a comparator 52 when the sub-sample control signal supplied via a line 1216 does not assign the sub-sample, and supplies "0" to the comparator 52 when it assigns the sub-sample. The comparator 52 compares the dead zone assigned value supplied via a line 1217 with the quantized prediction error signal supplied from the quantizer 18 and, when the absolute value of the quantized prediction error signal is smaller than the dead zone assigned value, the quantized prediction error is changed to "0" and, when it is larger, the quantized prediction error signal is supplied as it is. An adder 19 adds the quantized prediction error signal supplied via a line 1718 and the prediction signal supplied via a line 1418, and supplies the added result to an interpolation circuit 51 as a local decoded signal. The interpolation circuit 51 interpolates the focused picture element from the local decoding signal of the peripheral picture elements when the focused picture element is indicated as a sub-sampled picture element under the sub-sample control signal supplied via a line 1215. While, the interpolation circuit 51 supplies the focused picture element which is not sub-sampled to the frame memory 20 unchanged, leaving as it is. The frame memory 20 stores the local decoded signal by one frame period to delay it and supplies it to the subtractor 17 and the adder 19 as the prediction signal. A code converter 21 converts the quantized prediction error signal into a Huffman code or the like and delivers it to a transmission path 2000.

As described above, the present invention provides an inter-frame predictive coding apparatus which can suppress the amount of information generated by a noise and the like in the stationary region and can remove spots on the image brought about by an interpolation error and a coarse quantization.

What is claimed is:

1. An inter-frame coding apparatus for an input video signal having a quantizer, which comprises:
   an input terminal for receiving said input video signal;
   means coupled to said input terminal for processing said input video signal to determine whether respective picture elements are of a moving video content or a stationary video content and to produce a moving-stationary information signal;
   means for storing said moving-stationary information signal of at least one frame period;
   means coupled to said input terminal for delaying said input video signal to supply a delayed input video signal for said quantizer; and
   means coupled to said storing means for determining a quantization characteristic in response to said moving-stationary information signal stored in said storing means to produce a quantization control signal; said quantization control signal being applied to said quantizer to control said quantizer.

2. An inter-frame coding apparatus for an output video signal having a quantizer, which comprises:
   means responsive to said input video signal for determining whether respective picture elements are of a moving video content or a stationary video content to produce a moving-stationary information signal;
   means for storing said moving-stationary information signal of at least one frame period; and
   means for determining a quantization characteristic in response to said moving-stationary information signal stored in said storing means to produce a quantization control signal; said quantization control signal being applied to said quantizer to control said quantizer;
   wherein said quantization characteristic determining means includes means for computing a distance between a picture element of said stationary video content and a picture element of said moving video content when said picture element of said stationary video signal is coded, said quantization characteristic determining means determining said quantization characteristic such that quantization is made coarser as the distance becomes longer.

3. An inter-frame coding apparatus for an output video signal having a quantizer, which comprises:
   means responsive to said input video signal for determining whether respective picture elements are of a moving video content or a stationary video content to produce a moving-stationary information signal;
   means for storing said moving-stationary information signal of at least one frame period; and
   means for determining a quantization characteristic in response to said moving-stationary information signal stored in said storing means to produce a quantization control signal; said quantization control signal being applied to said quantizer to control said quantizer;

wherein said quantization characteristic determining means determines said quantization characteristics such that coarse quantization and fine quantization are alternatively made at predetermined intervals with respect to a picture element of said stationary video content.

4. An inter-frame coding apparatus for an output video signal having a quantizer, which comprises:

means responsive to said input video signal for determining whether respective picture elements are of a moving video content or a stationary video content to produce a moving-stationary information signal;

means for storing said moving-stationary information signal of at least one frame period; and means for determining a quantization characteristic in response to said moving-stationary information signal stored in said storing means to produce a quantization control signal; said quantization control signal being applied to said quantizer to control said quantizer;

wherein said quantization characteristic determining means includes means for detecting a transit of a certain picture element from said moving video content to said stationary video content and determines said quantization characteristics such that fine quantization is performed with respect to said certain picture element when said transit is detected, followed by coarse quantization.

5. An inter-frame predictive coding apparatus for an input video signal comprising:

an input terminal for receiving said input video signal;

means coupled to said input terminal for delaying said input video signal to deliver a delayed input video signal;

means coupled to said delaying means for producing an inter-frame predictive error signal in response to said delayed input video signal;

means coupled to said input terminal for processing said input video signal to determine whether respective picture elements correspond to a moving video content or to a stationary video content and to produce a moving-stationary information signal;

means for storing said moving-stationary information signal of at least one frame period;

means for determining a quantization characteristic in response to said moving stationary information signal stored in said storing means to produce a quantization control signal; and means responsive to said quantization control signal for quantizing said inter-frame predictive error signal.

6. An inter-frame predictive coding apparatus comprising:

an input terminal for receiving an input video signal, means coupled to said input terminal for delaying said input video signal, means coupled to said delaying means for determining a difference in amplitude of picture elements at the same location between one frame of said input video signal and a frame of a video signal which precedes said one frame;

means for quantizing said difference, means coupled to said input terminal for detecting that particular picture elements in said one frame of said input video signal belong to a stationary image region, and means responsive to said detecting means for controlling said quantizing means such that the output of said quantizing means becomes zero with respect to the difference of said particular picture elements between said one frame and the preceding frame.

7. An inter-frame predictive coding apparatus for an input video signal comprising:

means for producing an inter-frame predictive error signal in response to said input video signal;

means responsive to said input video signal for determining whether respective picture elements correspond to a moving video content or to a stationary video content to produce a moving-stationary information signal;

means for storing said moving-stationary information signal of at least one frame period;

means coupled to said storing means for computing a distance between a picture element of said stationary video content and a picture element of said moving video content when said picture element of said stationary video content is coded, to produce a quantization control signal; and means responsive to said quantization control signal for quantizing said inter-frame predictive error signal, whereby a quantization characteristic of said quantizing means is designated to be coarser in accordance with said distance computed by said computing means.

8. An inter-frame predictive coding apparatus for an input video signal comprising:

means for producing an inter-frame predictive error signal in response to said input video signal;

means responsive to said input video signal for determining whether respective picture elements correspond to a moving video content or to a stationary video content to produce a moving-stationary information signal;

means for storing said moving-stationary information signal of at least one frame period;

means coupled to said storing means for producing a quantization switching control signal with respect to a picture element of said stationary video content when said stationary video content continues for a predetermined number of successive frame periods; and means responsive to said quantization switching control signal for quantizing said inter-frame predictive error signal, whereby a quantization characteristic of said quantizing means is alternately switched between coarse quantization and fine quantization in response to said quantization switching control signal.

9. An inter-frame predictive coding apparatus for an input video signal comprising:

means for producing an inter-frame predictive error signal in response to said input video signal;

means responsive to said input video signal for determining whether respective picture elements correspond to a moving video content or to a stationary video content to produce a moving-stationary information signal;

means for storing said moving-stationary information signal of at least one frame period;

means coupled to said storing means for detecting a transit of a certain picture element between said moving video content and said stationary video content to produce a quantization control signal; and means coupled to said detecting means for quantizing said inter-frame predictive error signal, whereby fine quantization is performed in response to said quantization control signal.

10. An inter-frame predictive coding apparatus for an input video signal comprising:
- means for producing an inter-frame predictive error signal in response to said input video signal;
- means responsive to said input video signal for determining whether respective picture elements correspond to a moving video region or to a stationary video region to produce a moving-stationary information signal;
- means for storing said moving-stationary information signal of at least one frame period;
- means coupled to said storing means for calculating a distance from a picture element of said stationary video region to a picture element of said moving video region when said picture element of said stationary video region is coded;
- means for quantizing said inter-frame predictive error signal; and
- means coupled to said calculating means for controlling said quantizing means for setting a zone where the output of said quantizing means is set to zero, said zone becoming wider in response to said distance.

* * * * *